United States Patent [19]

Cho

[11] Patent Number: 5,640,281
[45] Date of Patent: Jun. 17, 1997

[54] OUTSIDE FOLDABLE REARVIEW MIRROR FOR VEHICLE

[76] Inventor: Sung Ho Cho, Jin Heung Apt. 121-1112, 97-3 AnYang 1st Dong, AnYang City Kyungki-Province, Rep. of Korea

[21] Appl. No.: 297,951

[22] Filed: Aug. 31, 1994

[30] Foreign Application Priority Data

Oct. 12, 1993 [KR] Rep. of Korea ............... 1993 21057
Jul. 23, 1994 [KR] Rep. of Korea ............... 1994 17887

[51] Int. Cl.$^6$ ..................................................... G02B 5/08
[52] U.S. Cl. ........................... 359/841; 359/843; 359/877
[58] Field of Search .................................... 359/841, 843, 359/854, 872, 873, 874, 877

[56] References Cited

U.S. PATENT DOCUMENTS

| | | |
|---|---|---|
| 4,626,084 | 12/1986 | Kumai . |
| 4,789,232 | 12/1988 | Urbanek ........................... 350/632 |
| 4,798,967 | 1/1989 | Yamana et al. ................... 359/841 |
| 4,973,146 | 11/1990 | Nakayama ........................ 359/841 |
| 4,981,347 | 1/1991 | Nakayama ........................ 359/841 |
| 5,008,603 | 4/1991 | Nakayama et al. ............... 359/841 |
| 5,148,325 | 9/1992 | Wang ............................... 359/877 |
| 5,337,190 | 8/1994 | Kogita et al. .................... 359/841 |
| 5,339,192 | 8/1994 | Cho ................................. 359/877 |

*Primary Examiner*—Timothy P. Callahan
*Assistant Examiner*—Jeffrey Zweizig
*Attorney, Agent, or Firm*—Keck, Mahin & Cate

[57] ABSTRACT

An outside rearview mirror for vehicles having a fixed part and a folding part pivotally connected to each other. A reversible motor is mounted on the fixed part. A serrate shaft is commonly received in the pivot bosses of the parts, thus to pivotally couple the folding part to the fixed part. The rotational force of the motor is transmitted to the serrate shaft through power transmission means. The pivot boss of the folding part has an internal gear gearing into the serrate shaft, the internal gear coupling the second pivot boss to the serrate shaft in the spline type coupling. Both the rotating motion and the number of revolutions of the motor are controlled by motor control means. The power transmission means comprises a drive gear on the output shaft of the motor and speed reduction middle gears gearing into both the drive gear and the serrate shaft. The motor control means comprises an automatic/manual operation convert switch, a folding part closing/opening switch and a relay, a transfer contact relay, a folding part position detecting sensor and a limit switch part.

2 Claims, 5 Drawing Sheets

OUTSIDE FOLDABLE REARVIEW MIRROR FOR VEHICLE

This application is related to U.S. Pat. No. 5,339,192.

BACKGROUND OF THE INVENTION

1. Field of the Invention

The present invention relates to an outside rearview mirror installed in vehicle. The rearview mirror is movable to eliminate the blind spot and, particularly, structural improvement in such outside rearview mirrors enables interior control for positions of the rearview mirrors using an interior control switch mounted within the interior of the vehicle body.

2. Description of the Prior Art

Movable outside rearview mirrors to eliminate the blind spot are well known in the art. For example, U.S. Pat. No. 4,789,232 discloses a break-away pivot system for outside rearview mirrors. A movable outside rearview mirror having the above-mentioned system can be opened or closed by external force. However, since the moving part of this rearview mirror is always opened, a driver of a vehicle equipped with such a rearview mirror encounters difficulty in driving the vehicle on a narrow street or to park on the narrow street. Furthermore, when the driver carelessly drives the vehicle while carelessly parks on such a narrow street, the careless driver may cause a scar on his vehicle body as well as on other vehicle bodies.

In order to overcome those problems, U.S. patent application Ser. No. 07/997,929, now U.S. Pat. No. 5,339,192, based on the Korean Patent Appln. No. 91-25105 discloses an improved movable outside rearview mirror. This rearview mirror consists of a fixed part and a folding part. A reversible motor is mounted in the interior of the rearview mirror. The rotating force of the reversible motor causes a plate coil spring mounted on a gear to be extended or compressed and causes the folding part fixed to the end of the plate spring to be opened or closed within a predetermined angle.

However, since the folding part is rotated by the biasing force of the plate coil spring, the power transmission for the rotational force of the motor to the folding part is not reliable. Therefore, the above-mentioned outside rearview mirror may have an operational difficulty and reduced durability. In the U.S. patent application Ser. No. 07/997,929, the outside rearview mirror should be attached to the drive means. The result of such combination is structurally very complicated, so that this rearview mirror is difficult to make and the total cost is increased. Furthermore, the plate coil spring of the above rearview mirror may be inadvertently compressed even when the motor stops, and the folding part may be undesirably moved.

SUMMARY OF THE INVENTION

It is, therefore, an object of the present invention to provide an outside rearview mirror for vehicles in which the aforementioned problems of conventional mirrors can be overcome and which assures reliable power transmission of the rotational force of a reversible motor to a folding part for improving the operation of the folding part, which rearview mirror also provides durable connection between the folding part and the fixed part and renders the folding part movable only in the case of rotation of the reversible motor.

It is another object of the present invention to provide an outside rearview mirror for vehicles which has a simplified power transmission structure while being readily produced and repaired. To reduce the production costs, the outside rearview mirror also readily changes its appearance because of the slim structure of the fixed part.

In order to accomplish the above objects, an outside rearview mirror for vehicles, in accordance with an embodiment of the present invention, includes a fixed part and a folding part, the fixed part being mounted on a vehicle body and having a first pivot boss and the folding part having a mirror as well as a second pivot boss and being pivotally coupled to the fixed part. Such device further includes a) a reversible motor mounted within the fixed part, b) a serrate shaft slipped into both the first and second pivot bosses which pivotally couples the folding part to the fixed part, c) power transmission means for transmitting rotational force of the reversible motor to the serrate shaft, d) the second pivot boss having an internal gear, while the internal gear is geared into the serrate shaft and the second pivot boss couples to the serrate shaft in the spline type, and causes the folding part to rotate about the serrate shaft simultaneously to rotation of the shaft and, as a result, closes or opens the folding part, and e) motor control means for controlling both the rotating direction and the number of revolutions of the motor.

BRIEF DESCRIPTION OF THE DRAWINGS

The above and other objects, features and other advantages of the present invention will be more clearly understood from the following detailed description taken in conjunction with the accompanying drawings, in which:

FIG. 5 and 6 are front views showing the positions of the rearview mirror of FIG. 1 respectively, in which:

FIG. 5 shows the rearview mirror in the fully opened position; and

FIG. 6 shows the rearview mirror in the 90° closed position;

FIG. 8 and 9 are from views showing the positions of the rearview mirror of FIG. 7 respectively, in which:

FIG. 8 shows the rearview mirror in the fully opened position; and

FIG. 9 shows the rearview mirror in the 90° closed position;

DESCRIPTION OF PREFERRED EMBODIMENTS

Figure 1:
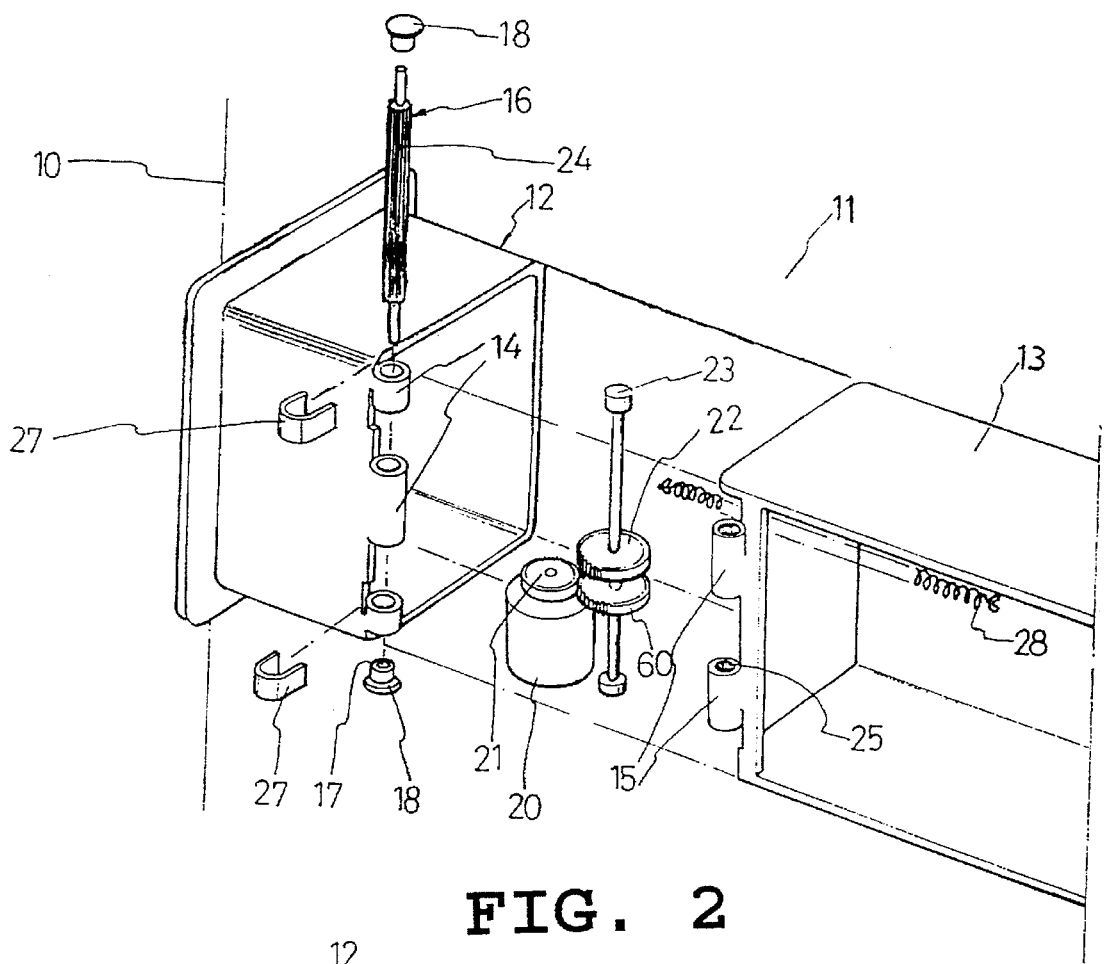
FIG. 1 is a partially exploded perspective view of an outside rearview mirror for vehicles, in accordance with a preferred embodiment of the present invention.
Figure 2:
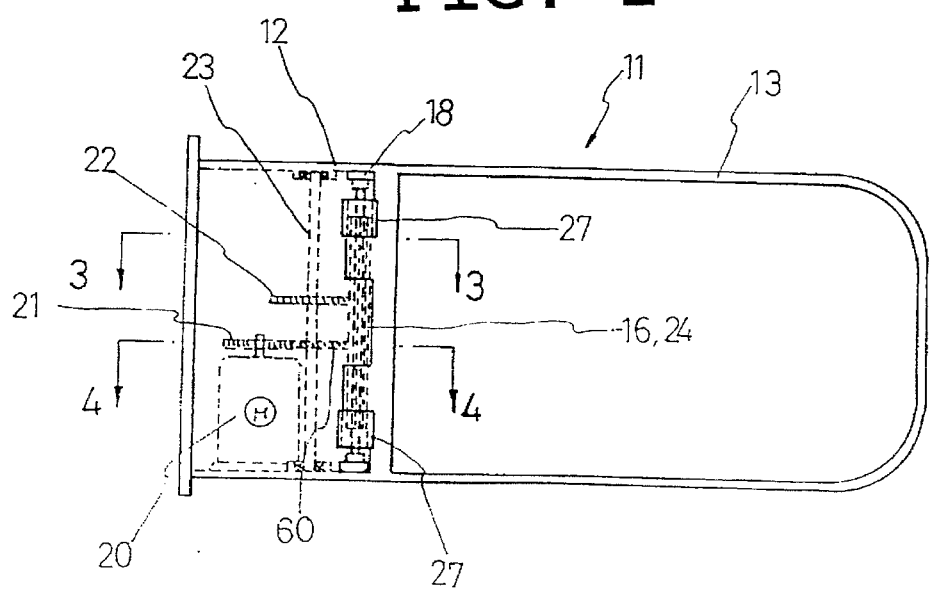
FIG. 2 is a front view of the rearview mirror of FIG. 1, showing assembled elements.
Figure 3:
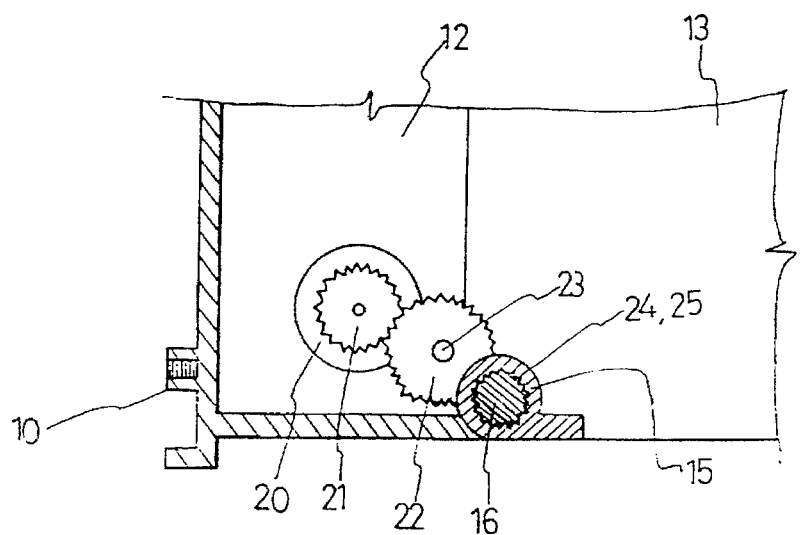
FIG. 3 is an enlarged sectional view of the rearview mirror, according to the primary embodiment taken along the section line A—A of FIG. 2.
Figure 4:
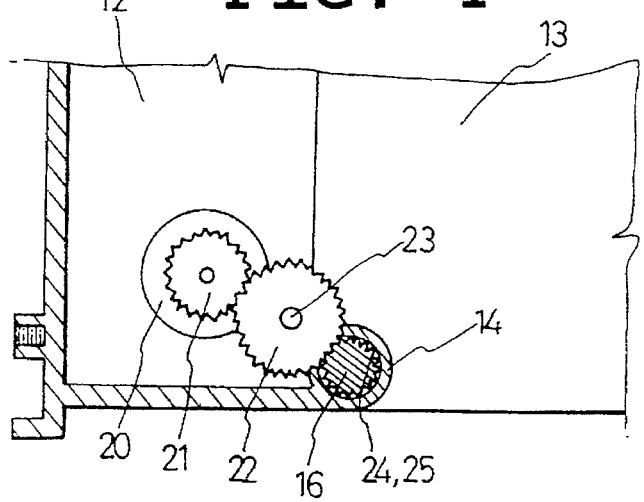
FIG. 4 is an enlarged sectional view of the rearview mirror, according to the primary embodiment taken along the section line B—B of FIG. 2.
Figure 5:
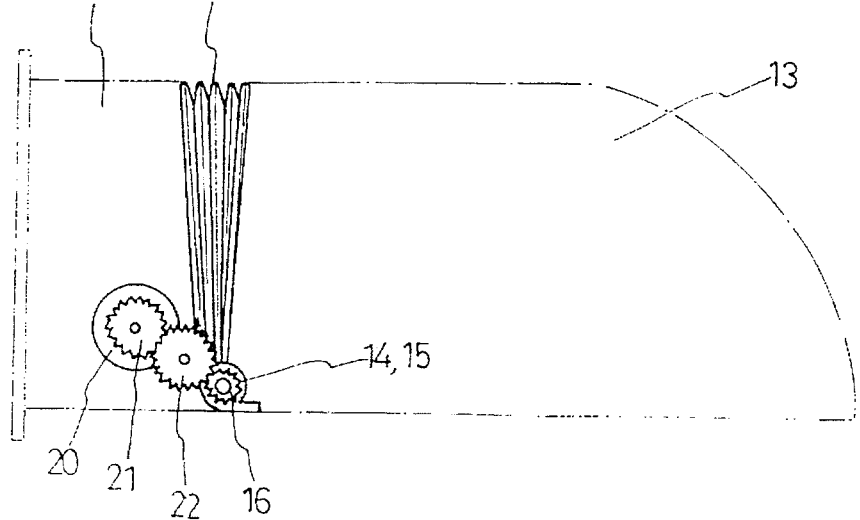

FIG. 1 shows an outside rearview minor for vehicles, in accordance with a primary embodiment of the present invention. As shown in this drawing, the rearview mirror designated by the numeral 11 comprises a fixed part 12, which is fixedly mounted to the exterior 10 of a vehicle body, and a folding part 13 which is pivotally coupled to the fixed part 12. Both the fixed part 12 and the folding part 13 are provided with respective pivot bosses 14 and 15 which project from the front edges of the parts 12 and 13. A senate shaft 16 is slipped into the pivot bosses 14 and 15 of the parts 12 and 13. As a result, shaft 16 pivotally couples or hinges the folding part 13 to the fixed part 12. Both ends of the shaft 16 are engaged with associated bearings 17 and in turn are covered with associated caps 18 to prevent the shaft 16 from separating from the pivot bosses 14 and 15. The space between the rest of the sides, except for the front edges of the fixed and folding parts 12 and 13, is covered with a bellows type cover 19, as shown in FIG. 5. This bellows type cover 19 prevents introduction of foreign substances such as rain or snow into the space between the parts 12 and 13. The bellows type cover 19 also provides a good appearance for the rearview mirror.

Reversible motor 20 is mounted in the fixed part 12. The output shaft of the reversible motor 20 cooperates with the serrate shaft 16 through power transmission means. It is desirable that the power transmission means between the output shaft and the serrate shaft includes a gear train which contains a drive spur gear 21 mounted to the output shaft of the motor 20. The gear train further includes a driven gear 24 on the serrated outer surface of the shaft 16. The driven gear 24 of the serrate shaft 16 indirectly gears into the drive gear 21 through upper and lower speed-reduction middle gears 22 and 60, so that the serrate shaft 16 is rotated by the rotational force of the motor 20. A common rotating shaft of the middle gear 22 and 60 is preferably supported by the interior wall of the fixed part 12.

In order to change the position of the folding part 13 and to open or close the folding part 13, the rotational force of the shaft 16 should be transmitted to the folding part 13 to rotate the folding part 13 about the shaft 16. In the present invention, the power transmission of the rotational force of the shaft 16 to the folding part 13 may be achieved through the following process.

According to one embodiment, the pivot bosses 14 of the fixed part 12 have no teeth but the pivot bosses 15 of the folding part 13 have internal gears 25. These internal gears 25 gear into the driven gear 24 of the shaft 16. The shaft 16 is thus coupled to the pivot bosses 15 of the folding part 13 in the spline type coupling, so that the folding part 13 is rotated by the rotational force of the shaft 16 (see FIGS. 1–6).

Figure 7:
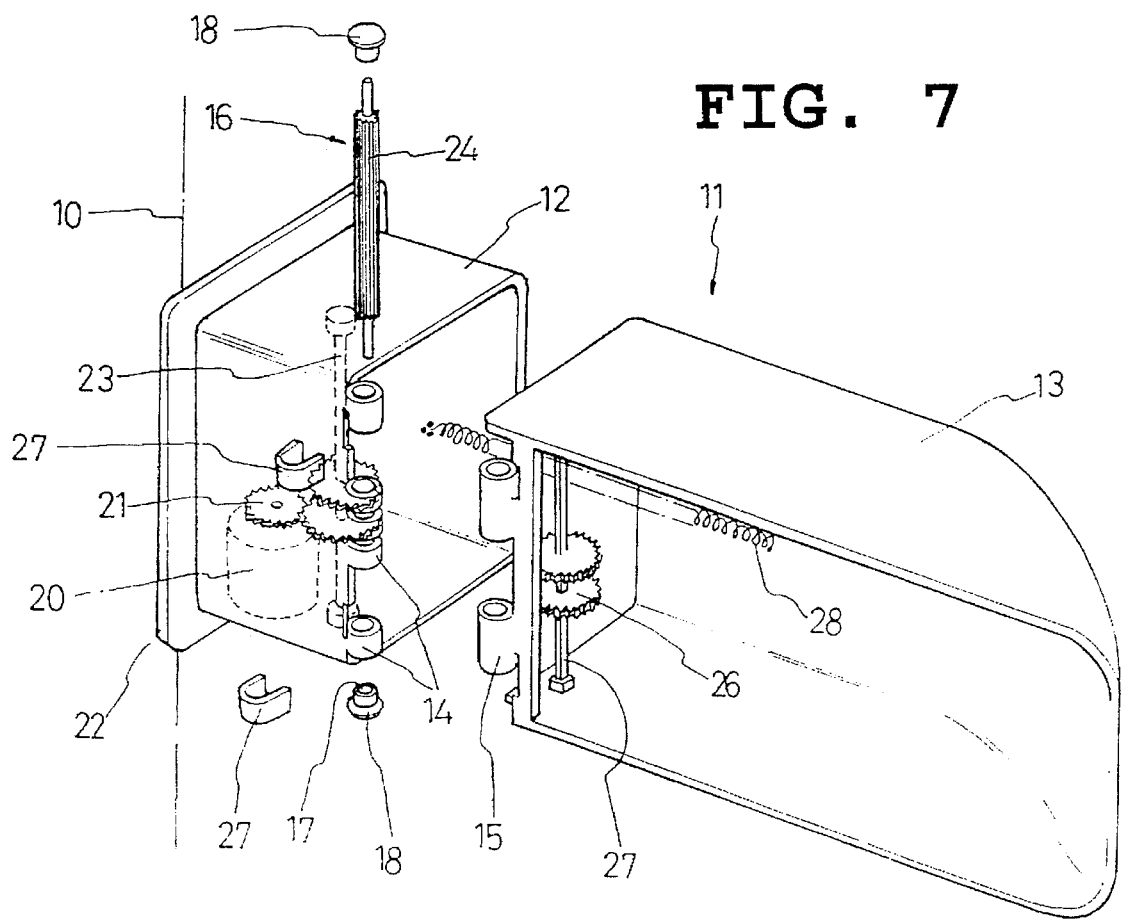
FIG. 7 is a partially exploded perspective view of an outside rearview mirror for vehicles, in accordance with a second embodiment of the present invention.
Figure 8:
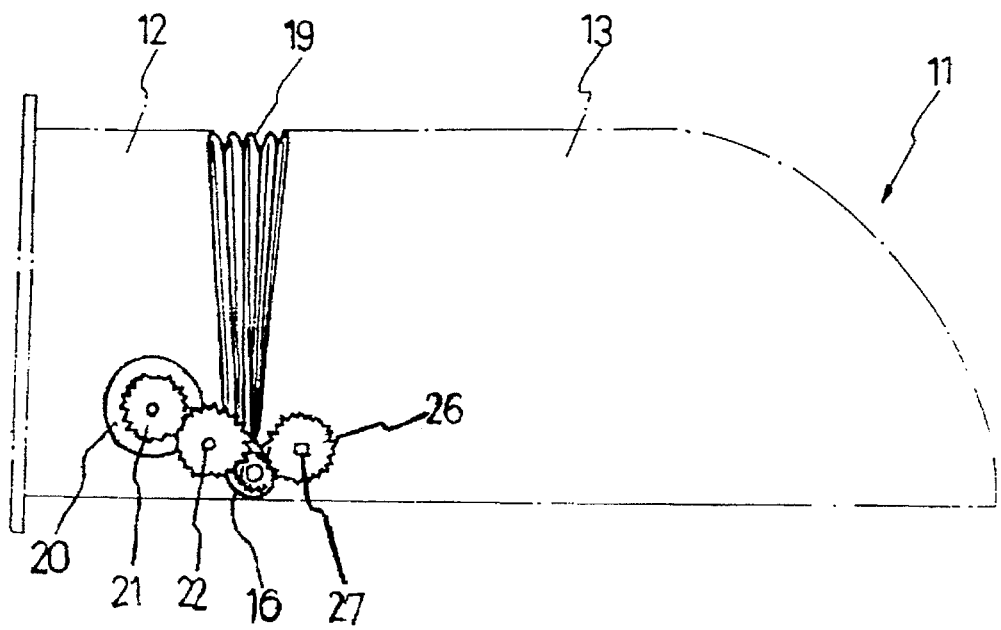
Figure 9:
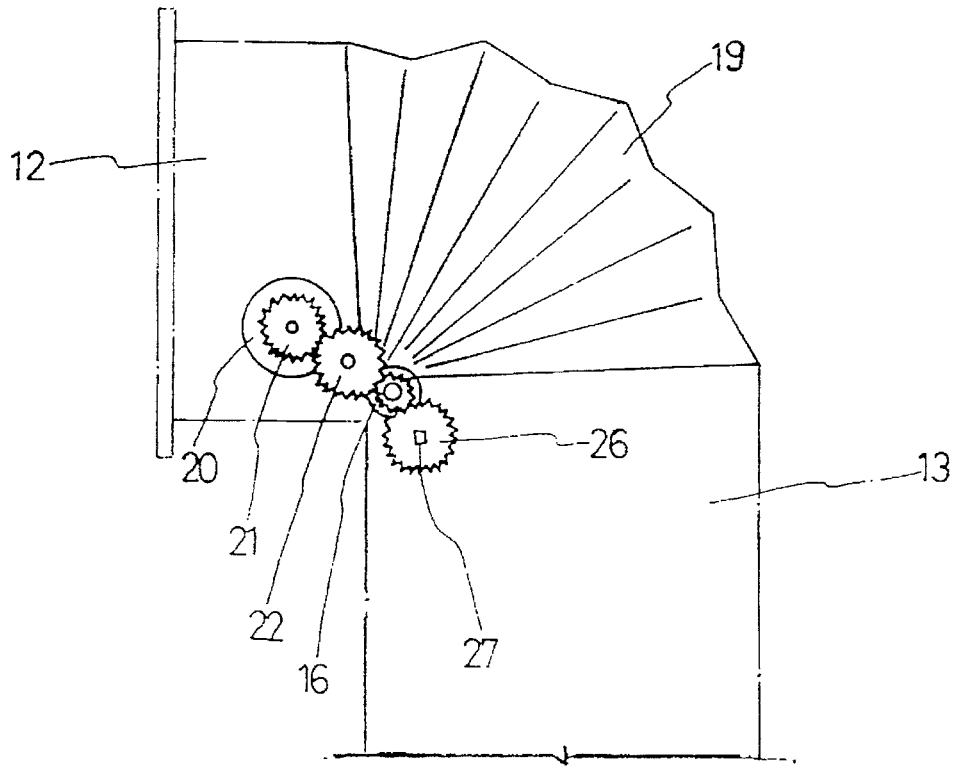

FIGS. 7–9 illustrate second embodiment of the present invention. According to second embodiment, the folding part 13 may have a planet gear 26 instead of the internal gears 25, which planet gear 26 is mounted within the interior of the folding part 13 and geared into the driven gear 24 of the shaft 16. The shaft 27 of the planet gear 26 is fixedly mounted within the folding part 13 so as to rotate the planet gear 26 about the shaft 16. The folding part 13 is thus rotated by the rotational force of the shaft 16 (see FIGS. 7–9).

In accordance with still another embodiment, U-shaped plate springs 27 are provided on tops and bottoms of the pivot bosses 14 and 15 of the parts 12 and 13 to retain an open position of the folding part 13. In this case, each of the U-shaped plate springs 27 is fixedly connected to the fixed part 12 at one end and fixedly connected to the folding part 13 at the other end thereof (see FIG. 2). Alternatively, coil spring 28 is coupled to both the freed part 12 and the folding part 13 at its opposite ends, as shown in FIG. 1. The coil spring 28 aids the folding part 13 to remain in an open position.

Figure 10:
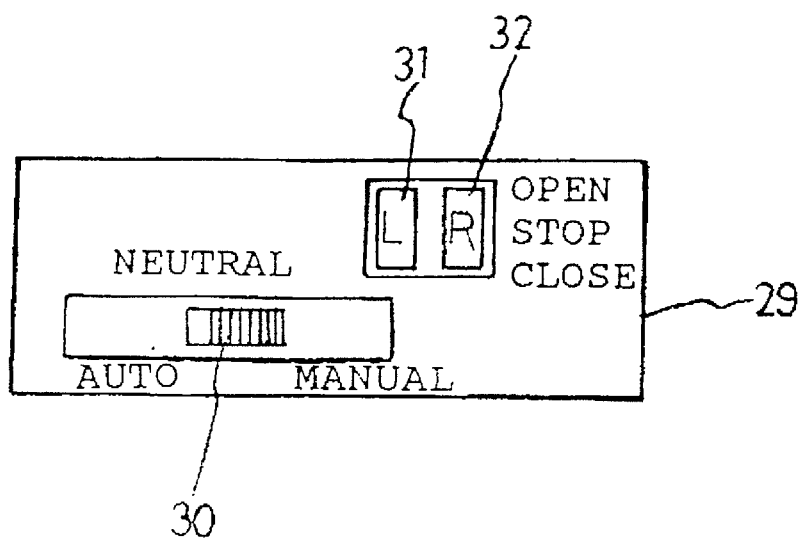
FIG. 10 is a plan view of a control panel for controlling a rearview mirror of the present invention.

As illustrated in FIG. 10, in order for interior control of the position of the outside rearview mirror, according to the present invention, motor control means should be mounted within the interior of the vehicle body. In the present invention, the motor control means includes a control panel 29 which is mounted within the interior of the vehicle body and contains an automatic/manual converter switch 30, as shown in FIG. 10. The switch 30 determines whether, the folding part 13 will be automatically handled by the rotational force of a vehicle motor. The control panel 29 further includes a left folding part opening/closing switch 31 and a right folding part opening/closing switch 32 which open, stop or close the left and fight folding parts 13, respectively, when the converter switch 30 is in the manual control state.

When the automatic/manual converter switch 30 is in the automatic control state, the folding parts 13 of the left and fight rearview mirrors are automatically opened, simultaneously into the start of the vehicle motor. In this case, the folding parts 13 of the left and fight rearview mirrors automatically close as soon as the vehicle motor stops. On the contrary, when the automatic/manual converter switch 30 is in the manual control position, the opening or closing motion of the folding parts 13 of the left and fight rearview mirrors is manually controlled by the opening/closing switches 31 and 32.

In a normal state, the folding parts 13 are retained in the open position. Such a normal state is achieved by shifting the automatic/manual converter switch 30 to a center position.

When the left and right opening/closing switches 31 and 32 are positioned in neither the closed side nor the open side, the folding parts 13 of the left and right rearview mirrors stop in the properly dosed positions. Therefore, the left and right outside rearview mirrors simply eliminate the blind spot.

If described in detail, the automatic/manual converter switch 30 of the drive control circuit determines whether the folding parts 13 of the left and right rearview mirrors will be automatically opened or closed by the rotational force of the vehicle motor.

When the converter switch 30 is in the manual control state, both the left closing/opening switch 31 and the left relay 33 control the left folding part 13 so as to open, stop, or close the left folding part 13. In the same manner, both the right closing/opening switch 32 and the right relay 34 control the right folding part 13 when the converter switch 30 is in the manual control state to open, stop or dose the right folding part 13.

The left transfer contact relay 40 closes either the left closing contact 48 or the left opening contact 50 when the automatic/manual converter switch 30 is in the automatic control state. In the same manner, the right transfer contact relay 41 doses either the right closing contact 49 or the right opening contact 51 when the automatic/manual converter switch 30 is in the automatic control state.

The left position detecting sensor 42 detects the position of the folding part 13 of the left rearview mirror. In the same manner, the fight position detecting sensor 43 detects the position of the folding part 13 of the fight rearview mirror.

The left limit switch part 52, including beth the left closing switch 44 and the left opening switch 46, controls the closing or opening motions of the left folding part 13 in cooperation with the left position detecting sensor 42. In the same manner, the fight limit switch part 53, including beth the fight closing switch 45 and the fight opening switch 47, controls the closing or opening motion of the fight folding part 13 in cooperation with the fight position detecting sensor 43.

The operational effect of the outside rearview mirror of the present invention will be given hereinbelow the reference to the fight rearview mirror as an example.

Figure 6:
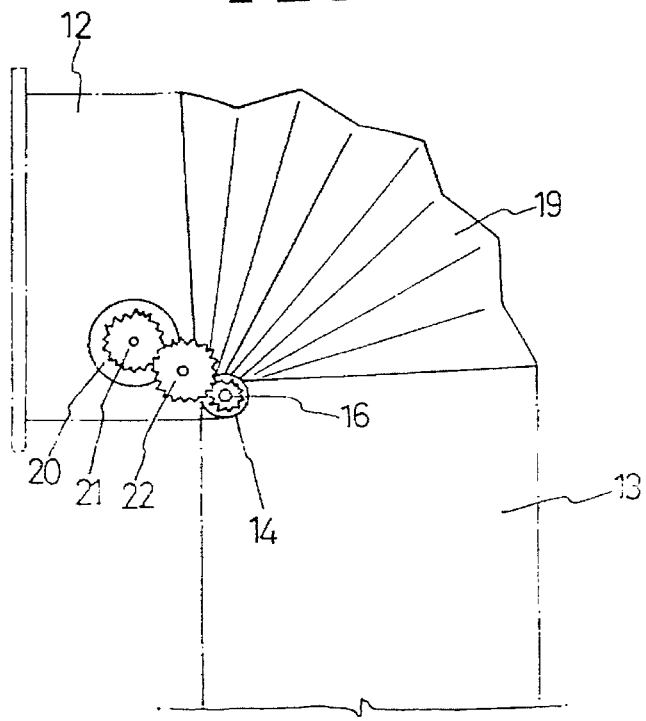

When a vehicle provided with the rearview mirror is to be moved or parked on a narrow street, under the condition that the folding part 13 of the fight rearview mirror 11 is fully opened, as shown in FIG. 5 or 8, the folding part 13 should be closed so as to reduce the width of the vehicle body and to prevent possible collision of the folding part 13 against an obstacle. In order to reduce the width of the vehicle body, the fight closing/opening switch 32 is pushed when the automatic/manual converter switch 30 is placed in the manual control position which, as a result, closes the opened folding part 13 at a 90° angle, as shown in FIG. 6 or 9. That is, the fight opening/closing switch 32 is pushed to the closed side of the switch 32 so that the reversible motor 20 is rotated in either direction. The drive gear 21 of the output shaft of the motor 20 is rotated in the same direction and the rotational force of the drive gear 21 is transmitted to the serrate shaft 16 through the middle gears 22 and 60, gearing into both the drive gear 21 and the driven gear 24. The rotation of the senate shaft 16 causes a tunning motion of the pivot bosses 15 of the folding part 13 and rotates folding part 13 clockwise about the serrate shaft 16 until the folding part 13 is fully closed at an angle of 90°.

When the folding part 13 is fully closed at an angle of 90°, the right closing limit switch 47 stops the rotation of the folding part 13. When the right opening/closing switch 32 is placed in the neutral state, the rotation of the folding part 13 can be stopped before the part 13 is fully closed. On the contrary, when the open side of the closing/opening switch 32 is pushed, the reversible motor 20 is rotated in reverse direction, so that the closed folding part 13 will be opened.

As described above, the outside rearview mirror for vehicles, in accordance with the present invention, assures the reliable power transmission of the rotational force of a reversible motor to a folding part of the rearview mirror to improve opening and closing operation of the folding part. The rearview mirror of this invention also provides a durable connection between the folding part and the fixed part and enables the folding part to move only when the motor rotates. Furthermore, the outside rearview mirror of this invention has a simplified power transmission structure readily produced and repaired with reduction of manufacturing cost. The rearview mirror also readily changes its appearance because of the slim structure of the fixed part.

Although the preferred embodiments of the present invention have been disclosed for illustrative purposes, those skilled in the art will appreciate the various modifications, additions and substitutions are possible, without departing from the scope and spirit of the invention as disclosed in the accompanying claims.

What is claimed is:

1. An outside rearview mirror for vehicles comprising a fixed part and a folding part, said fixed part being mounted on a vehicle body and having a first pivot boss and said folding part having a mirror as well as a second pivot boss and being pivotally coupled to the fixed part, further comprising:

a reversible motor mounted within said fixed part;

a serrate shaft commonly received in said first and second pivot bosses, thus to pivotally couple the folding part to the fixed part;

power transmission means for transmitting the rotational force of the reversible motor to the serrate shaft;.

a second pivot boss having an internal gear, said internal gear gearing into said serrate shaft and coupling said second pivot boss to said serrate shaft in a spline type coupling and rotating the folding part around the serrate shaft simultaneous to rotation of said shaft to close or open said folding part, wherein the serrate shaft and the folding part pivot relative to the fixed part;

motor control means for controlling both the rotating motion and the number of rotations of the motor; and a spring for retaining an open position of said folding part, opposite ends of said spring being fixed to said fixed part and said folding part, respectively.

2. An outside rearview mirror for vehicles comprising a fixed part and a folding part, said fixed part being mounted on a vehicle body and having a first pivot boss and said folding part having a mirror as well as a second pivot boss and being pivotally coupled to the fixed part, further comprising:

a reversible motor mounted within said fixed part;

a serrate shaft commonly received in said first and second pivot bosses, thus to pivotally couple the folding part to the fixed part;

power transmission means for transmitting the rotational force of the reversible motor to the serrate shaft;

said second pivot boss having a planet gear, said planet gear being mounted within the interior of the folding part and gearing into the serrate shaft, a shaft of said planet gear being fixedly mounted within the folding part to allow said planet gear to be rotated about the serrate shaft; and motor control means for controlling both the rotating motion and the number of rotations of the motor.

* * * * *